United States Patent
Nakada

(10) Patent No.: US 8,585,270 B2
(45) Date of Patent: Nov. 19, 2013

(54) VEHICULAR LAMP

(75) Inventor: Asami Nakada, Shizuoka (JP)

(73) Assignee: Koito Manufacturing Co., Ltd. (JP)

( * ) Notice: Subject to any disclaimer, the term of this patent is extended or adjusted under 35 U.S.C. 154(b) by 0 days.

(21) Appl. No.: 13/399,701

(22) Filed: Feb. 17, 2012

(65) Prior Publication Data

US 2012/0218775 A1  Aug. 30, 2012

(30) Foreign Application Priority Data

Feb. 24, 2011  (JP) .................................. 2011-038415

(51) Int. Cl.
*F21V 7/04* (2006.01)
(52) U.S. Cl.
USPC .......................................... 362/602; 362/603
(58) Field of Classification Search
USPC ................................................ 362/601–623
See application file for complete search history.

(56) References Cited

U.S. PATENT DOCUMENTS 6,247,826 B1 *  6/2001  Funamoto et al. ............ 362/603

FOREIGN PATENT DOCUMENTS

JP  2002-367404  12/2002

* cited by examiner

Primary Examiner — Anne Hines
(74) Attorney, Agent, or Firm — Cantor Colburn LLP

(57) ABSTRACT

Disclosed is a vehicular lamp with a light guide that extends along a curve which becomes a convexed shape forwardly. A first area of the light guide positioned on an inner peripheral side of the curve is configured by a plane that extends in a direction inclined toward a left end surface side with respect to a second area other than first area. As a result, light which is incident on the light guide from the first area to which light from an LED is emitted is largely refracted forwardly to prevent the light from directly reaching a reflection element positioned in the vicinity of the right end surface. In addition, point light is prevented from being generated as the light totally reflected by the reflection element is extremely brighter than the light that is totally reflected by another reflection element as in the related art.

4 Claims, 4 Drawing Sheets

VEHICULAR LAMP

CROSS-REFERENCE TO RELATED APPLICATIONS

This application is based on and claims priority from Japanese Patent Application No. 2011-038415, filed on Feb. 24, 2011 with the Japanese Patent Office, the disclosure of which is incorporated herein in its entirety by reference.

TECHNICAL FIELD

The present disclosure relates to a vehicular lamp with a light guide.

BACKGROUND

There has been known a vehicular lamp in which light emitted from a light source such as a light emitting diode (LED) is incident on one end surface of a light guide and thereafter, internally reflected by a plurality of reflection elements formed on a rear surface portion of the light guide to be emitted forwardly from a front surface portion thereof.

Japanese Patent Application Laid-Open No. 2002-367404 discloses a vehicular lamp that has a configuration in which the light guide extends along a curve which becomes a convexed shape forwardly toward the other end surface from one end surface.

By adopting the lamp configuration disclosed in Japanese Patent Application Laid-Open No. 2002-367404, a surface shape of the vehicular lamp may be easily conformed to a shape of a vehicle body.

However, when the light guide extends along the curve which becomes a convexed shape forwardly toward the other end surface from the one end surface, some portion of light which is incident from the one end surface to which light from a light source is emitted, reaches directly a reflection element positioned in the vicinity of the one end surface. As a result, light internally reflected by the reflection element becomes extremely bright light as compared with light internally reflected by other reflection elements.

Therefore, when the light guide is viewed from the front of the lamp, a so called point light phenomenon in which only a part around the one end surface shines brightly occurs, and as a result, the lamp does not look nice when the lamp is turned ON.

The present disclosure has been made in an effort to provide a vehicular lamp with a light guide, which may look nice when the lamp is turned ON even when the light guide extends along a curve which becomes convex forwardly toward the other end surface from one end surface.

SUMMARY

The present disclosure is contrived to achieve the object by studying a surface shape of one end surface of a light guide on which light from a light source is incident.

An exemplary embodiment of the present disclosure provides a vehicular lamp, which comprises: a light source; and a light guide that emits light from the light source forwardly from a front surface portion of the light guide by allowing the light to be incident from one end surface of the light guide and thereafter, to be internally reflected by a plurality of reflection elements formed on a rear surface portion thereof. The light guide extends along a curve which becomes a convexed shape forwardly toward the other end surface of the light guide from the one end surface and a first area positioned at an inner peripheral side of the curve on the one end surface is configured by a surface that extends in a direction inclined toward the other end surface side with respect to a second area other than the first area on the one end surface.

In the vehicular lamp of the present disclosure, the second area is configured by a plane substantially orthogonal to the curve.

Further, in the vehicular lamp, the first area is configured by a concave cylindrical surface that extends in a direction substantially orthogonal to a plane including the curve.

A type of "the light source" is not particularly limited, but for example, an LED may be adopted.

A cross-sectional shape of "the light guide" is not particularly limited, but, for example, a circular or rectangular cross-sectional shape may be adopted. Further, even a direction in which "the light guide" extends is not particularly limited to a specific direction, but for example, a configuration in which a plane including "a curve which becomes convex forwardly" may extend on a horizontal surface or a vertical surface may be adopted.

If "the reflection element" is an element configured to internally reflect the light that is emitted from the light source and reached the reflection element, a specific cross-sectional shape thereof is not particularly limited. Further, "the internal reflection" by the reflection element may be total reflection or general specular reflection by performing specular processing of the surface of the reflection element.

If "the first area" is an area positioned on the inner peripheral side of the curve on the one end surface of the light guide, its specific range to be formed is not particularly limited. Further, if "the first area" is configured by a surface that extends in a direction inclined toward the other end surface of the light guide with respect to the second area other than the first area, the surface may be configured by a plane or a curved surface, and further, a specific value of an inclination angle is not particularly limited.

"The second area" may also be configured by the plane or the curved surface.

As described in the configuration, the vehicular lamp according to the present disclosure has a configuration in which light emitted from a light source is incident from one end surface of a light guide and thereafter, internally reflected on a plurality of reflection elements formed on a rear surface portion of the light guide to be emitted forwardly from a front surface portion thereof. Meanwhile, since the light guide extends along the curve which becomes a convexed shape forwardly toward the other end surface from the one end surface, a surface shape of the vehicular lamp may be easily conformed to a shape of a vehicle body.

Moreover, in the vehicular lamp according to the present disclosure, since the first area positioned on the inner peripheral side of the curve on one end surface of the light guide is configured by a surface that extends in the direction inclined toward the other end surface of the light guide with respect to the second area other than the first area, it is possible to prevent the light from directly reaching the reflection element positioned in the vicinity of the one end surface or suppress the amount of the directly reaching light to a small amount by refracting forwardly light which is incident on the light guide from the first area to which light from a light source is emitted more largely.

Therefore, point light is prevented from being generated as the light internally reflected by the reflection element positioned in the vicinity of the one end surface becomes extremely brighter than the light that is internally reflected by another reflection element as in the related art.

In this case, the light that is largely refracted forwardly in the first area on the one end surface of the light guide is totally reflected on the front surface portion and thereafter, internally reflected by another reflection element and emitted forwardly from the front surface portion, and as a result, the entirety of the light guide may look bright substantially uniformly without uselessly wasting the light from the light source.

Therefore, according to the present disclosure, in the vehicular lamp with the light guide, the vehicular lamp may look nice during the lamp is turned ON even when the light guide extends along the curve which becomes a convexed shape forwardly toward the other end surface from one end surface.

In the configuration, when the second area on the one end surface of the light guide is configured by the plane substantially orthogonal to the curve, a light path of light which is incident on the light guide from the second area to which light from a light source is emitted may be easily calculated.

In the configuration, when the first area on the one end surface of the light guide is configured by a concave cylindrical surface that extends in a direction substantially orthogonal to a plane including the curve, light which is incident on the light guide from the first area to which light from a light source is emitted is diffused to a direction along the plane including the curve, and as a result, a reaching position of the light on the front surface portion may be widespread. Therefore, after light reaches the front surface portion, the light totally reflected on the front surface portion is internally reflected by many reflection elements to be emitted forwardly from the front surface portion, and as a result, the entirety of the light guide may look bright more uniformly.

In the case of adopting the configuration, some portion of light which is incident on the light guide from the first area to which light from a light source is emitted may reach directly the reflection element positioned around the first area. However, in this case, since the light directly reaching the reflection element is some portion of diffused light and its amount is small, the light internally reflected by the reflection element cannot become extremely bright light, thereby generating point light.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

In the following detailed description, reference is made to the accompanying drawing, which form a part hereof. The illustrative embodiments described in the detailed description, drawing, and claims are not meant to be limiting. Other embodiments may be utilized, and other changes may be made, without departing from the spirit or scope of the subject matter presented here.

Hereinafter, an exemplary embodiment of the present disclosure will be described with reference to the accompanying drawings.

Figure 1:
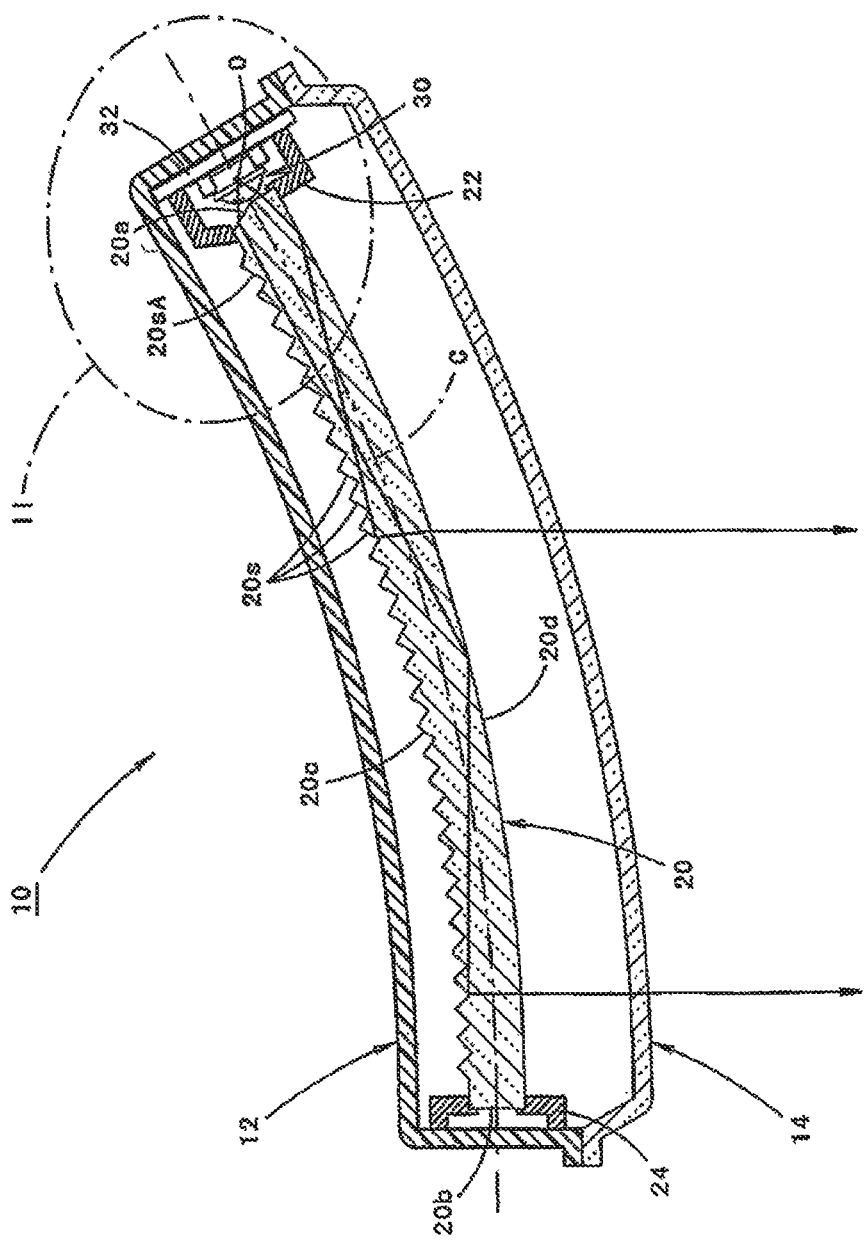
FIG. 1 is a plan cross-sectional view illustrating a vehicular lamp according to an exemplary embodiment of the present disclosure.

FIG. 1 is a plan cross-sectional view illustrating a vehicular lamp 10 according to the exemplary embodiment.

As shown in FIG. 1, vehicular lamp 10 is a tail lamp installed at a right rear end of a vehicle and has a configuration in which a light guide 20 that extends in a curve shape in a vehicle width direction and an LED 30 that is placed around a right end surface 20a of light guide 20 are inserted into a lamp chamber constituted by a lamp body 12 and a transparent translucent cover 14 attached to a front end opening of lamp body 12.

In a description of the exemplary embodiment, a front or rear direction such as "a forward" or "a rearward" is a direction in relation to vehicular lamp 10 and is reverse to a direction in relation to a vehicle.

Light guide 20 is formed as a light guiding pillar that extends along a curve C which becomes a convexed shape forwardly toward a left end surface 20b thereof from a right end surface 20a thereof. In this case, curve C extends in a direction in which a tangential direction of light guide 20 is inclined toward the left with respect to a front direction of the lamp at approximately 60° at the position of right end surface 20a of light guide 20 and further, extends in a direction in which the tangential direction is substantially orthogonal to the front direction of the lamp at the position of left end surface 20b thereof.

Light guide 20 has a circular cross-sectional shape centered on a point on curve C and a plurality of reflection elements 20s are consecutively formed in a sawtooth shape at parts of a rear surface portion 20c other than both left and right ends thereof. In this case, each reflection element 20s is configured as a total reflection prism that extends in an upward-downward direction.

Meanwhile, an LED 30 is placed in a direction inclined toward the left with respect to the front direction of the lamp at approximately 60° with a light emitting center O positioned on curve C. LED 30 is fixedly supported on a light source supporting member 32. In addition, light source supporting member 32 is fixedly supported on a lamp body 12.

Light guide 20 is fixedly supported on light guide supporting members 22 and 24 at both left and right ends thereof, respectively. In this case, light guide supporting member 22 supporting a right end of light guide 20 is fixedly supported on a light source supporting member 32 and light guide supporting member 24 supporting a left end thereof is fixedly supported on lamp body 12.

In vehicular lamp 10 according to the exemplary embodiment, light emitted from LED 30 is incident from right end surface 20a of light guide 20 and thereafter, internally reflected by the plurality of reflection elements 20s which are formed on rear surface portion 20c of light guide 20 through total reflection to be emitted forwardly from a front surface portion 20d thereof.

Left end surface 20b of light guide 20 is configured by a single plane orthogonal to curve C and right end surface 20a thereof is configured by a surface other than the left end surface.

Figure 2:
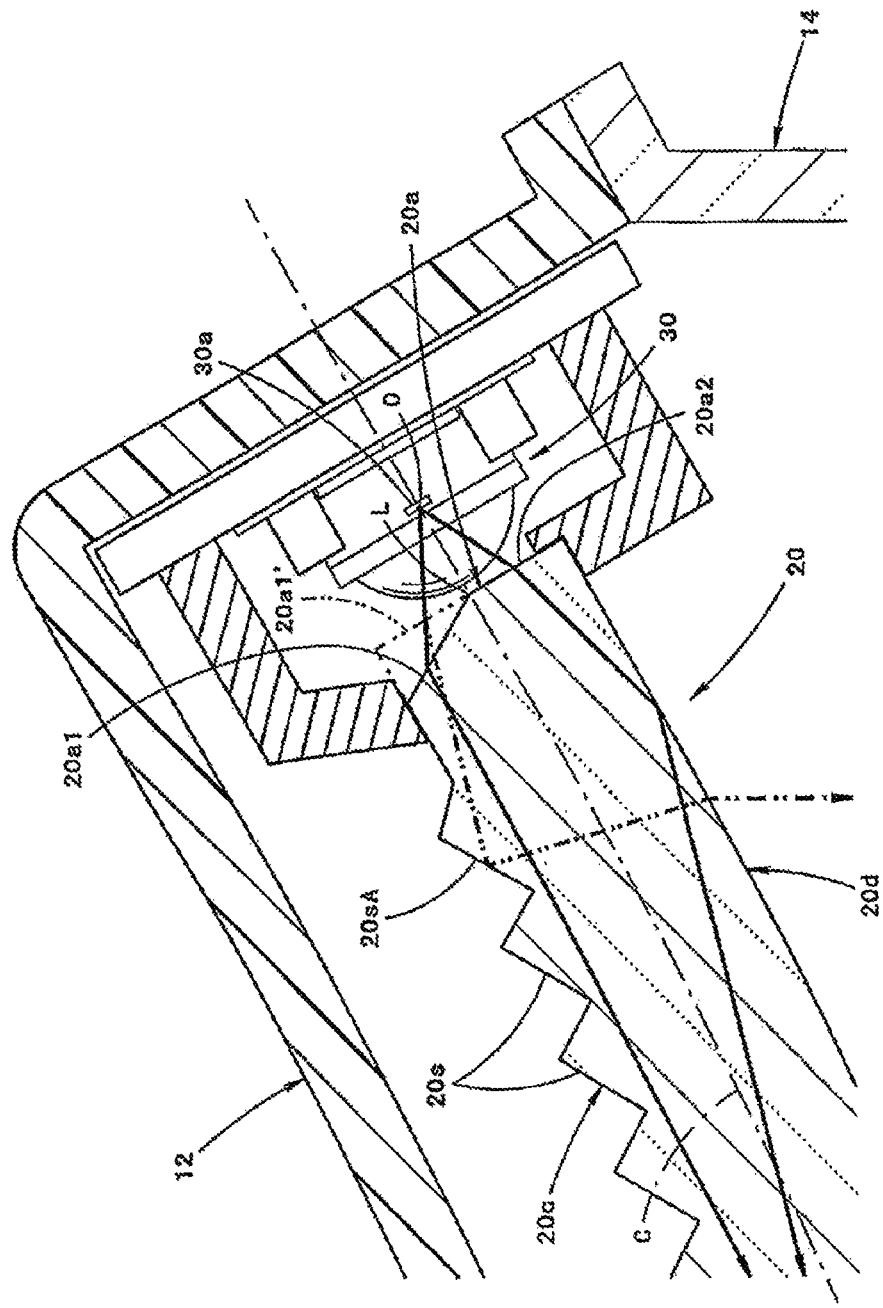
FIG. 2 is a detailed diagram of Part II of FIG. 1.
Figure 4A:
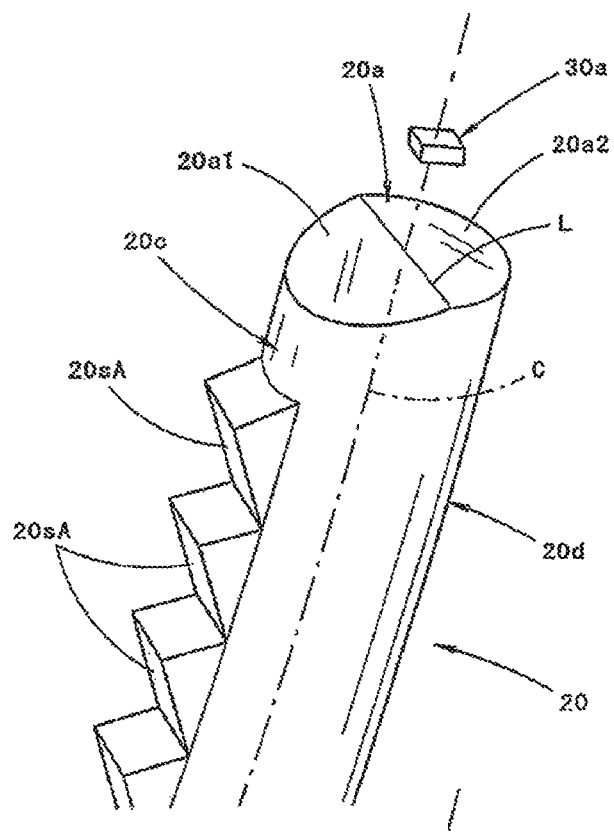
FIG. 4A and FIG. 4B are perspective views illustrating a principal part of a light guide of the exemplary embodiment and that of the modified example, respectively.

FIG. 2 is a detailed diagram of Part II of FIG. 1. Further, FIG. 4A is a perspective view illustrating the right end of light guide 20.

As shown in the figures, right end surface of light guide 20 is configured by a surface in which a first area 20a1 positioned in an inner peripheral side of curve C extends in a direction inclined toward left end surface 20b of light guide 20 with respect to a second area 20a2 (that is, an area other than first area 20a1) positioned in an outer peripheral side of curve C, based on a vertical line L crossing the curve C as a boundary portion.

In detail, second area 20a2 is configured by a plane orthogonal to curve C, while first area 20a1 is configured by a plane inclined toward left end surface 20b with respect to second area 20a2 at 20° (degrees) to 40° (for example, approximately 30°).

Further, LED 30 is placed so that a light emitting surface of a light emitting chip 30a extends on a plane orthogonal to curve C.

As shown in FIGS. 1 and 2, light that is emitted from LED 30 and reached second area 20a2 of right end surface 20a in light guide 20 is refracted toward the vicinity of curve C in second area 20a2. Thereafter, the refracted light is totally reflected on front surface portion 20d and further, totally reflected on plurality of reflection elements 20s formed on rear surface portion 20c thereof to be emitted forwardly from front surface portion 20d.

Light that is emitted from LED 30 and reached first area 20a1 of right end surface 20a in light guide 20 is also refracted toward the vicinity of curve C in first area 20a1. In this case, since first area 20a1 is inclined toward left end surface 20b side with respect to second area 20a2, the light is refracted toward the vicinity of curve C more largely than the light that reached second area 20a2. In addition, the light that is refracted from first area 20a1 to be incident on light guide 20 is totally reflected on front surface portion 20d and thereafter, totally reflected from plurality of reflection elements 20s formed on rear surface portion 20c to be emitted forwardly from front surface portion 20d.

Subsequently, an operational effect of the exemplary embodiment will be described.

In vehicular lamp 10 according to the exemplary embodiment, the light emitted from LED 30 (that is, the light source) is incident from right end surface 20a (that is, one end surface) with respect to light guide 20 and thereafter, totally reflected by the plurality of reflection elements 20s formed on rear surface portion 20c to be emitted forwardly from front surface portion 20d. However, since light guide 20 extends along curve C which becomes a convexed shape forwardly toward left end surface 20b (that is, the other end surface) from right end surface 20a, a surface shape of translucent cover 14 of vehicular lamp 10 may be easily conformed to a shape of a vehicle body.

In vehicular lamp 10 according to the exemplary embodiment, since first area 20a1 positioned on the inner peripheral side of curve C in right end surface 20a of light guide 20 is configured by a plane that extends in a direction inclined toward left end surface 20b side of light guide 20 with respect to second area 20a2, the following operational effect may be acquired.

That is, when first area 20a1 in right end surface 20a of light guide 20 is configured by a plane 20a1' orthogonal to curve C as in the configuration of related art shown by a two dotted dashed line in FIG. 2, light that is emitted from LED 30 and reached plane 20a1' is refracted toward the vicinity of curve C on plane 20a1'. In this case, since a deflection angle of the refracted light is smaller than that as in first area 20a1, some portion of light incident on light guide 20 from plane 20a1' reaches a reflection element 20sA positioned in the vicinity of plane 20a1' and totally reflected by reflection element 20sA to be emitted forwardly from front surface portion 20d. In this case, since the amount of the light reaching reflection element 20sA is significantly large, the amount of the light that is totally reflected by reflection element 20sA to be emitted forwardly from front surface portion 20d becomes also significantly large.

In this regard, like light guide 20 of the exemplary embodiment, when first area 20a1 positioned on the inner periphery of curve C on right end surface 20a is configured by the plane that extends in the direction inclined toward left end surface 20b side of light guide 20 with respect to second area 20a2, it is possible to prevent the light from directly reaching reflection element 20sA positioned in the vicinity of right end surface 20a or suppress the amount of the directly reaching light to a small amount by refracting forwardly light which is incident on light guide 20 from first area 20a1 to which light from LED 30 is emitted largely.

Therefore, point light is prevented from being generated as the light totally reflected by reflection element 20sA positioned in the vicinity of right end surface 20a becomes extremely brighter than the light that is totally reflected by another reflection element 20s as in the related art.

In this case, the light that is largely refracted forwardly in first area 20a1 in right end surface 20a of light guide 20 is totally reflected from front surface portion 20d and thereafter, totally reflected by another reflection element 20s to be emitted forwardly from front surface portion 20d. As a result, the entirety of light guide 20 may look bright substantially uniformly without uselessly using the light from LED 30.

Accordingly, according to the exemplary embodiment, in vehicular lamp 10 with light guide 20, vehicular lamp 10 may look nice while the lamp is turned ON even when light guide 20 extends along curve C which becomes a convexed shape forwardly toward left end surface 20b from right end surface 20a.

In this case, in the exemplary embodiment, since second area 20a2 on right end surface 20a of light guide 20 is configured by the plane orthogonal to curve C, a light path of the light which is incident on light guide 20 from second area 20a2 to which light from LED 30 is emitted may be easily calculated.

In the exemplary embodiment, the inner peripheral side of right end surface 20a of light guide 20 is configured as first area 20a1 and the outer peripheral side of right end surface 20a is configured as second area 20a2, based on vertical line L crossing curve C as a boundary portion, but an area ratio of first area 20a1 may be larger or smaller than such a case as above.

In the exemplary embodiment, the plurality of reflection elements 20s are consecutively formed in the saw-tooth shape at parts of rear surface portion 20c other than both left and right ends of rear surface portion 20c of light guide 20. However, even when the plurality of reflection elements 20s are not consecutively formed, the same operational effect as the exemplary embodiment may be acquired. Further, even when the plurality of reflection elements 20s are formed by stippling, the same operational effect as the exemplary embodiment may be acquired.

In the exemplary embodiment, light guide 20 is configured as the light guiding pillar and the light source is configured by single LED 30, but light guide 20 may be formed in a plate type and further, the plurality of LEDs 30 may be provided as the light source. In this case, when light guide 20 is formed as the plate type and the light source is constituted by the plurality of LEDs 30, the plurality of LEDs 30 may be placed in a row arrangement (line type or curve type) on one end surface of the light guide that is formed in the plate type.

Subsequently, a modified example of the exemplary embodiment will be described.

Figure 3:
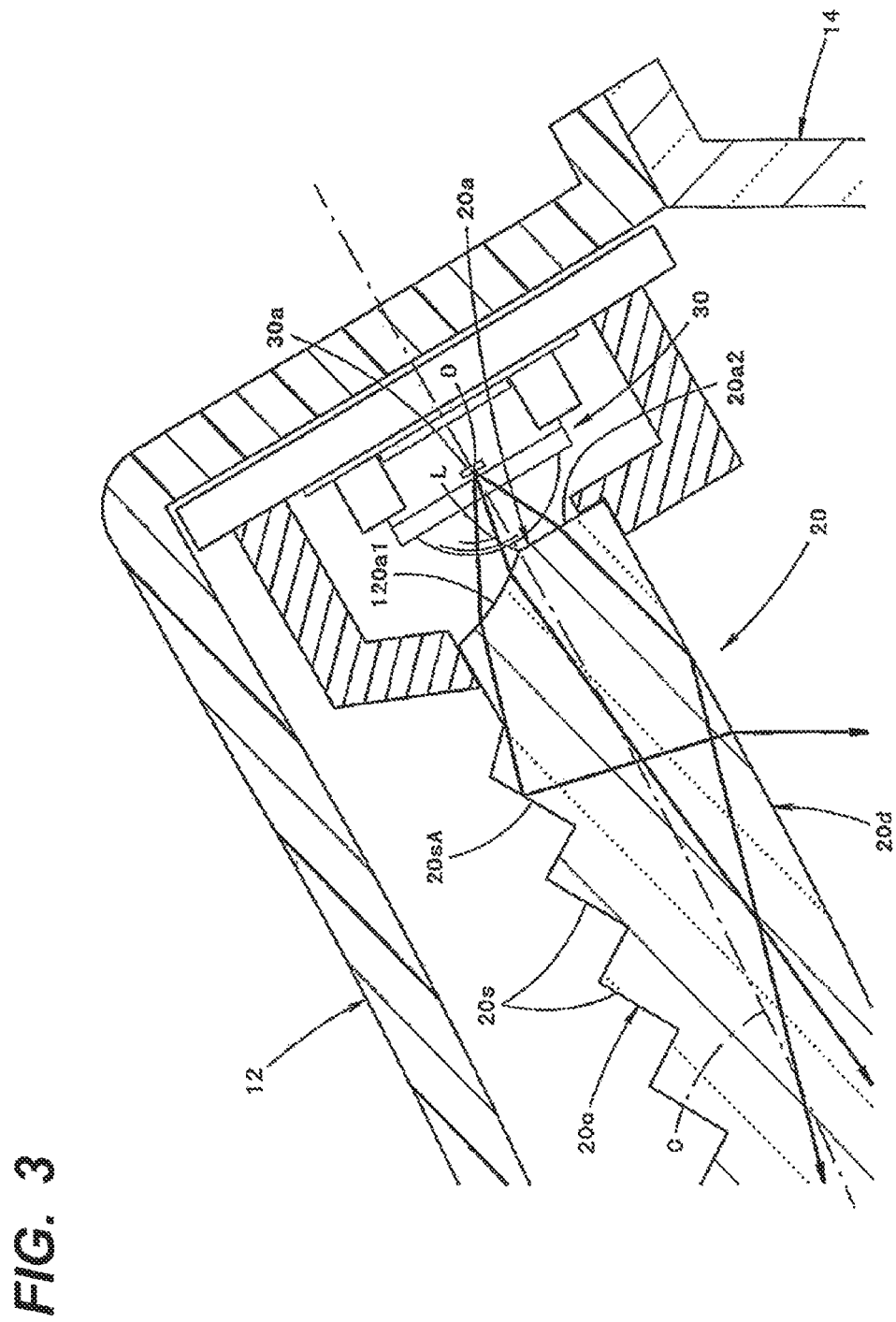
FIG. 3 is a diagram having the same pattern as FIG. 2, which illustrates a modified example of the exemplary embodiment.
Figure 4B:
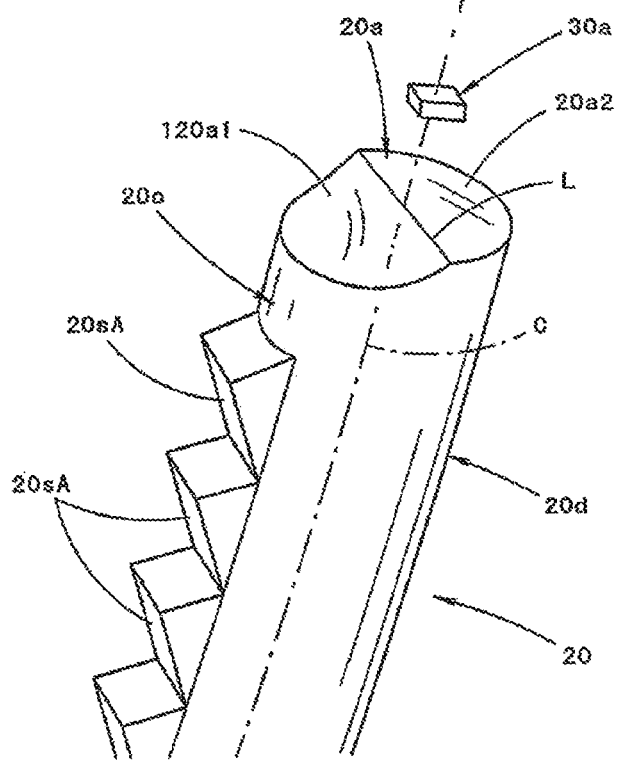

FIGS. 3 and 4B illustrate the modified example of the exemplary embodiment and are diagrams having the same pattern as FIGS. 2 and 4A, respectively.

As shown in the figures, even the modified example is similar to the exemplary embodiment in a basic configuration thereof, but a surface shape of a first area 120a1 in right end surface 20a of light guide 20 of the modified example is different from that of the exemplary embodiment.

That is, in the modified example, first area 120a1 in right end surface 20a of light guide 20 is configured by a concave cylindrical surface that extends in a direction substantially orthogonal to a plane including curve C. Meanwhile, the modified example is similar to the exemplary embodiment in that first area 120a1 is configured by a surface that extends in a direction inclined toward left end surface 20b side of light guide 20 with respect to second area 20a2.

In the modified example, as shown in FIG. 3, since the light which is incident on light guide 20 from first area 120a1 to which light from LED 30 is emitted may be diffused in a direction along a horizontal surface (that is, a direction along the plane including curve C), a reaching position of the light on front surface portion 20d may be widespread. Therefore, thereafter, light totally reflected from front surface portion 20d is totally reflected by many reflection elements 20s to be emitted forwardly from front surface portion 20d, and as a result, the entirety of light guide 20 may look bright more uniformly.

However, when the configuration of the modified example is adopted, as shown in FIG. 3, some portion of the light which is incident on light guide 20 from first area 20a1 to which light from LED 30 is emitted reaches directly even reflection element 20sA positioned around first area 20a1. In this case, the light that directly reaches reflection element 20s is some portion of diffused light and minimal and thus the light totally reflected by reflection element 20s is prevented from being extremely bright light and point light from being generated.

As in the modified example, when the plate type light guide instead of light guide 20 configured as the light guiding pillar, is adopted, only the concave cylindrical surface forming first area 120a1 of one end surface of the light guide may be configured to extend along the one end surface thereof.

The numerical values presented as dimensions in the exemplary embodiment and the modified example are just example, and, of course, the numeral values may be appropriately set to other values.

In the exemplary embodiment and the modified example, vehicular lamp 10 is the tail lamp installed at the right rear end of the vehicle, but even when vehicular lamp 10 is a tail lamp installed at the left rear end of the vehicle or a lamp other than the tail lamp, the same configuration as the exemplary embodiment is adopted to acquire the same operational effect as the exemplary embodiment.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. A vehicular lamp, comprising:
a light source; and
a light guide configured to emit light from the light source forwardly from a front surface portion of the light guide by allowing the light to be incident on a first end surface, and thereafter, to be internally reflected by a plurality of reflection elements formed on a rear surface portion thereof,
wherein the light guide extends from the first end surface along a curve which becomes a convexed shape forwardly toward a second end surface of the light guide, and
the first end surface includes a first area positioned on an inner peripheral side of the curve and configured by a first surface that extends in a direction inclined toward the second end surface side and a second area positioned on an outer peripheral side of the curve and configured by a second surface that is orthogonal to the curve.

2. The vehicular lamp of claim 1, wherein the second area is configured by a plane substantially orthogonal to the curve.

3. The vehicular lamp of claim 1, wherein the first area is configured by a concave cylindrical surface that extends in a direction substantially orthogonal to a plane including the curve.

4. The vehicular lamp of claim 1, wherein the first surface of the first area is inclined toward the second end surface side in a degree of 20° to 40°.

* * * * *